United States Patent [19]
Gandhi et al.

[11] 3,841,834
[45] Oct. 15, 1974

[54] AUTOMATIC PROTEIN ANALYSIS SYSTEM AND METHOD

[75] Inventors: Niranjan R. Gandhi; Gary H. Richardson, both of Logan, Utah

[73] Assignee: Utah State University Foundation, Logan, Utah

[22] Filed: June 26, 1973

[21] Appl. No.: 373,719

[52] U.S. Cl. .............................. 23/231, 23/253 R
[51] Int. Cl. ......................................... G01n 33/04
[58] Field of Search ...................... 23/230, 231, 253

[56] References Cited
UNITED STATES PATENTS

| | | | |
|---|---|---|---|
| 2,752,815 | 7/1956 | Batchelor | 23/231 |
| 3,442,623 | 5/1969 | Aegidius | 23/231 |
| 3,746,511 | 7/1973 | Stookey et al. | 23/231 |

OTHER PUBLICATIONS

Technicon International Congress 1970, Vol. II, Advances in Automated Analysis, Futura Publ. Co., Mount Kisco N.Y., pages 81–85 (QD 75 .T4a).

*Primary Examiner*—R. E. Serwin

[57] ABSTRACT

Method for automatically analyzing the protein content of a milk sample by utilizing the milk sample effluent from a conventional automatic milk butterfat testing apparatus.

3 Claims, 1 Drawing Figure

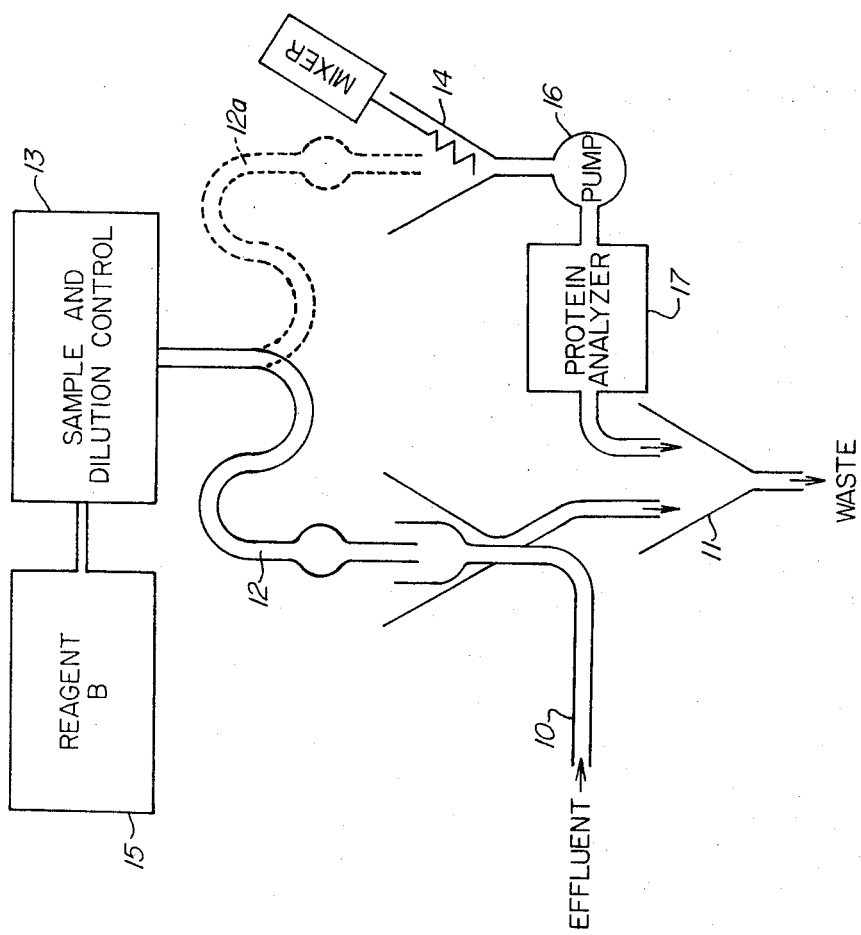

AUTOMATIC PROTEIN ANALYSIS SYSTEM AND METHOD

Currently, the butterfat content of a milk sample is electronically measured by mixing the milk sample with a suitable reagent to thereby clarify protein turbidity and allow butterfat to be measured turbidometrically in the milk sample. The degree of turbidity is indicative of the butterfat content of the milk sample and is measured with a conventional photocell system. Such a butterfat measuring reagent is, by way of example, a tetrasodium salt of (ethylenedinitrilo) tetraactic acid (hereinafter referred to as EDTA). This reagent shall hereinafter be referred to as Reagent A. EDTA is generally used with sodium hydroxide (NaOH) in an aqueous solution in a ratio of approximately 45 grams of EDTA to 6 grams of sodium hydroxide to make thereby a total volume of 10 liters in water. However, to date, there has been no coupling of the automated milk butterfat testing apparatus with a system for measuring the protein content of the same milk sample.

In the invention, disclosed herein, it has been found possible to use the sample effluent from a conventional milk butterfat content analyzer by treating a portion of the effluent with a second reagent and thereafter obtain an indication of the protein content of said milk sample by conventional analysis procedures utilizing ultraviolet light.

It is well known that the ultraviolet light absorbance characteristic of protein is linear when plotted against the amount of protein within a particular sample. The ultraviolet light source is in the ultraviolet range of 280 nanometers.

Applicants by their invention have made a significant contribution to the art of milk testing in that they have been able to suitably use the effluent from an automatic butterfat analyzing machine to obtain an accurate analysis of the protein content of said milk sample. Thus by coupling both capabilities into one analyzing system it is possible to obtain an indication of both the butterfat and protein content of the milk sample.

It is therefore an object of this invention to provide improvements in the art of analyzing the protein content of milk.

It is another object of this invention to utilize the effluent from an automatic butterfat analyzing machine as the sample source for an automatic protein analyzing system.

It is an even further object of this invention to use a previously discarded substance as the sample of which the protein content is analyzed.

These and other objects of this invention become more fully apparent from the accompanying drawing and description and claims relating thereto.

The drawing is a schematic of one possible embodiment of an automatic protein analyzer which utilizes the effluent from an existing automatic milk testing apparatus. In the presently preferred embodiment of this invention, it is essential that the automatic milk testing apparatus utilize EDTA as a butterfat content analyzing reagent. An example of such an automatic milk butterfat testing apparatus is the one sold by Foss America, Inc., Fishkill, N.Y., under the trade name "Milko-Tester."

Referring to the drawing, the effluent is shown entering at 10 to be thereafter suitably sampled in the protein analyzing system. Excess effluent is discarded as waste indicated at 11. A sample is suitably withdrawn from the sample area by sample pickup 12 which is controlled by sample and dilution control 13. The purpose of the sample and dilution control 13 is to obtain the sample at the appropriate moment in the cycle to assure a representative sample of milk effluent versus excessive Reagent A since excess Reagent A is used to flush the tubing of the butterfat testing apparatus and is carried off in the effluent stream. The sample pickup is shown by dashed lines at 12a to indicate that the sample is directed into mixing funnel 14 where it is suitably mixed with a second reagent comprising acetic acid and a suitable wetting agent. This second reagent shall hereinafter be referred to as Reagent B. The sample in sample pickup 12 is flushed into mixing funnel 14 by Reagent B from the Reagent B supply 15 in suitable quantities of Reagent B to appropriately dilute the sample.

Mixing funnel 14 assures that the sample and Reagent B are properly mixed before being passed through the protein analyzer. Pump 18 withdraws the sample at the appropriate time and passes the sample to the protein analyzer 17. Once analyzed for protein, the sample is discarded at waste 11.

Reagent B is comprised of acetic acid (approximately 95 percent) and a wetting agent. The wetting agent prevents the sample from adhering to the walls of the tubing and thus interfering with the ultraviolet light system. Any suitable wetting agent should be readily usable by this particular system as long as the wetting agent does not interfere with the ultraviolet light absorbance characteristics of the sample.

Once the milk sample has been suitably treated with Reagent B and suitably mixed to dilute the milk sample, it is passed through the protein analyzer 17. Protein analyzer 17 comprises an ultraviolet light system coupled with a digital converter to directly indicate the ultraviolet light absorbed by the sample as being representative of the percent protein in the particular sample. The optimum wavelength for the ultraviolet light has been found to be approximately 280 nanometers.

It has been determined that if untreated milk versus effluent milk is sampled directly during automatic sample pickup into sample pickup 12 the milk is drawn into the sample pickup against the acetic acid residue of Reagent B remaining from the previous sample cycle. Acetic acid causes denaturation of the milk protein, which is subsequently slow to dissolve and properly disperse, thus giving an erroneous reading by the protein analyzer because of the turbidity. Thus, an additional advantage to utilizing the effluent from an automatic milk testing apparatus over a separate milk sampling pickup system is shown by this observation. The effluent from the automatic milk butterfat testing apparatus which contains EDTA/sodium hydroxide solution (Reagent A) is more readily analyzed since this solution unfolds the protein molecule and disintegrates the casein micelles. When the resulting mixture is subsequently drawn into the protein sample tube there is very little problem with precipitation at the Reagent A/Reagent B interface. The partially dissolved proteins are thus more readily retained in solution and when subsequently mixed with acetic acid disperse more evenly and require less mixing time and agitation to assure repeatable and accurate results in the protein analyzer.

We claim:

1. A method for determining the protein content of milk sample comprising the steps of:
   a. sampling an effluent stream of an automatic milk butterfat analyzing system wherein said sample comprises a mixture of milk and a first reagent, said first reagent comprising ethylenedinitrilo tetraacetic acid, tetrasodium salt, sodium hydroxide, and water,
   b. mixing said sample with second reagent comprising acetic acid and a wetting agent which does not interfere with the absorbancy characteristics of ultraviolet light of a wavelength of about 280 nanometers; and
   c. measuring the ultraviolet light absorbance characteristic of said mixed sample.

2. A method for determining the protein content of a milk sample as defined in claim 1 wherein said first reagent is formulated on the basis of 45 grams of ethylenedinitrilo tetraacetic acid, tetrasodium salt and 6 grams sodium hydroxide in sufficient water to form a final mixture of 10 liters.

3. A method for determining the protein content of a milk sample as defined in claim 1 wherein said second reagent is formulated on the basis of 95 percent acetic acid and 5 percent of said wetting agent.

* * * * *